J. A. KIDWELL.
CREDIT SYSTEM CABINET.
APPLICATION FILED OCT. 23, 1915.

1,281,788.

Patented Oct. 15, 1918.
6 SHEETS—SHEET 1.

J. A. KIDWELL.
CREDIT SYSTEM CABINET.
APPLICATION FILED OCT. 23, 1915.
1,281,788.
Patented Oct. 15, 1918.
6 SHEETS—SHEET 2.
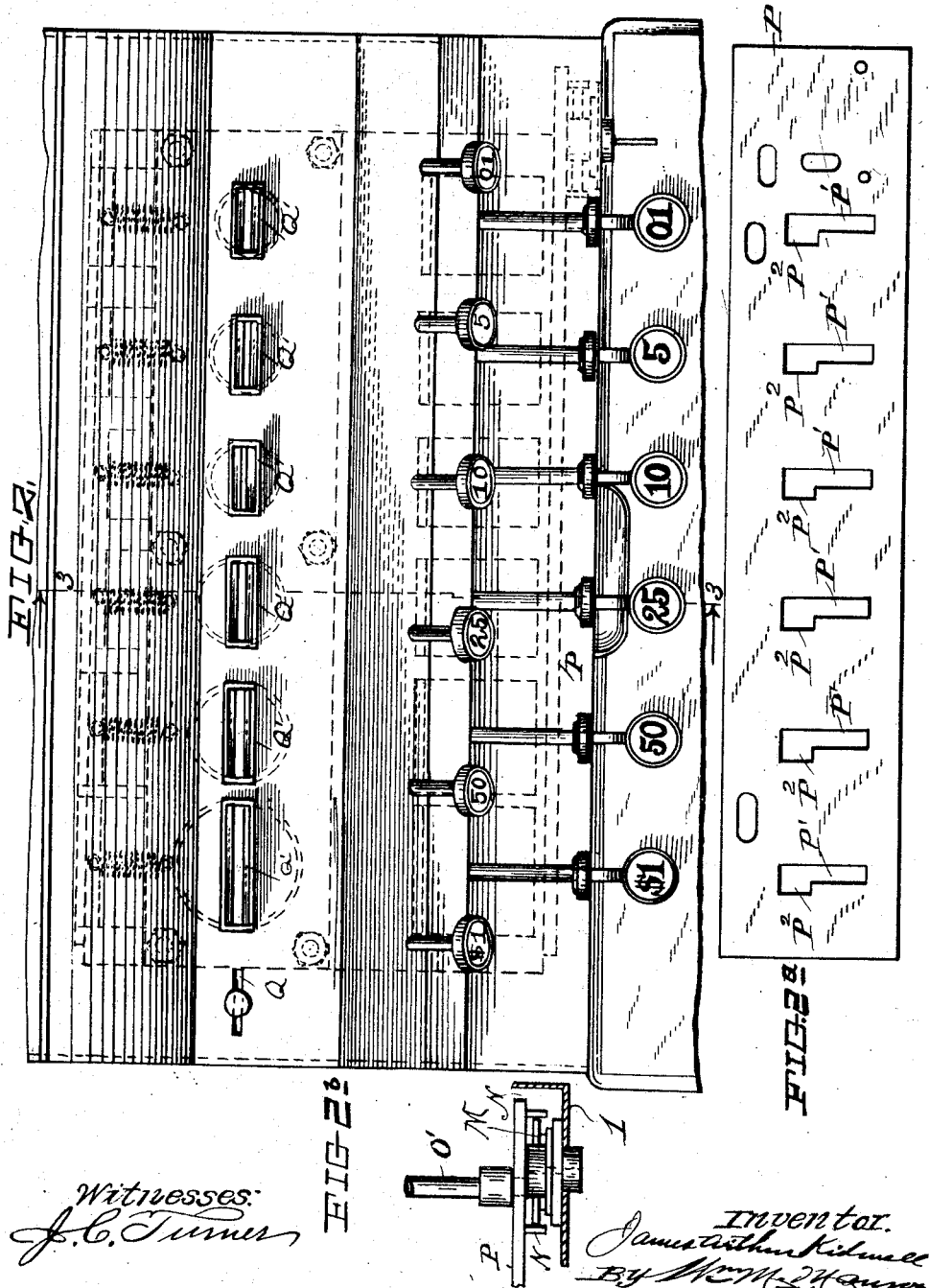

J. A. KIDWELL.
CREDIT SYSTEM CABINET.
APPLICATION FILED OCT. 23, 1915.
1,281,788.
Patented Oct. 15, 1918.
6 SHEETS—SHEET 3.
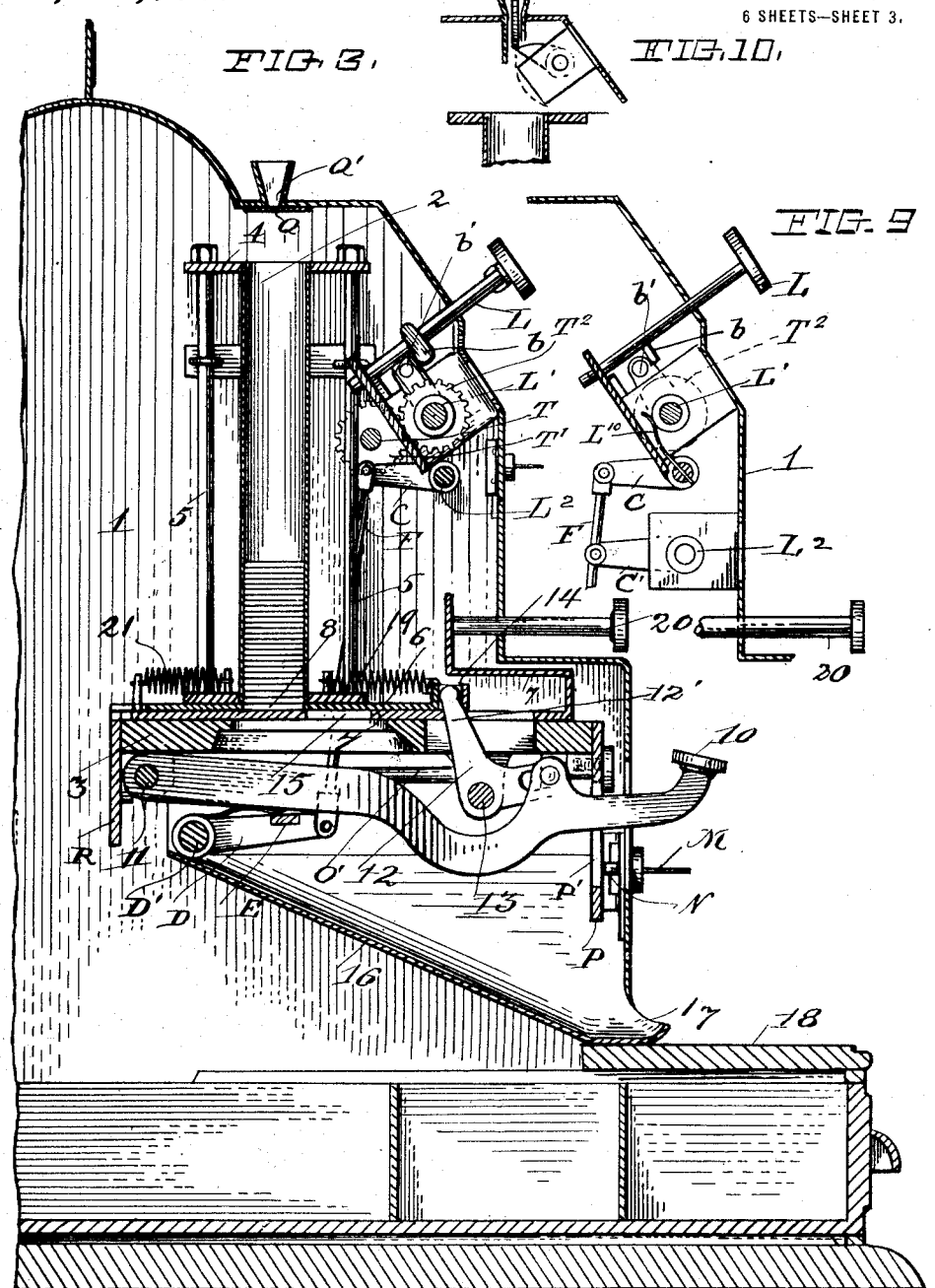
Witnesses:
J. C. Turner
Inventor.
James Arthur Kidwell
By
Attorney.

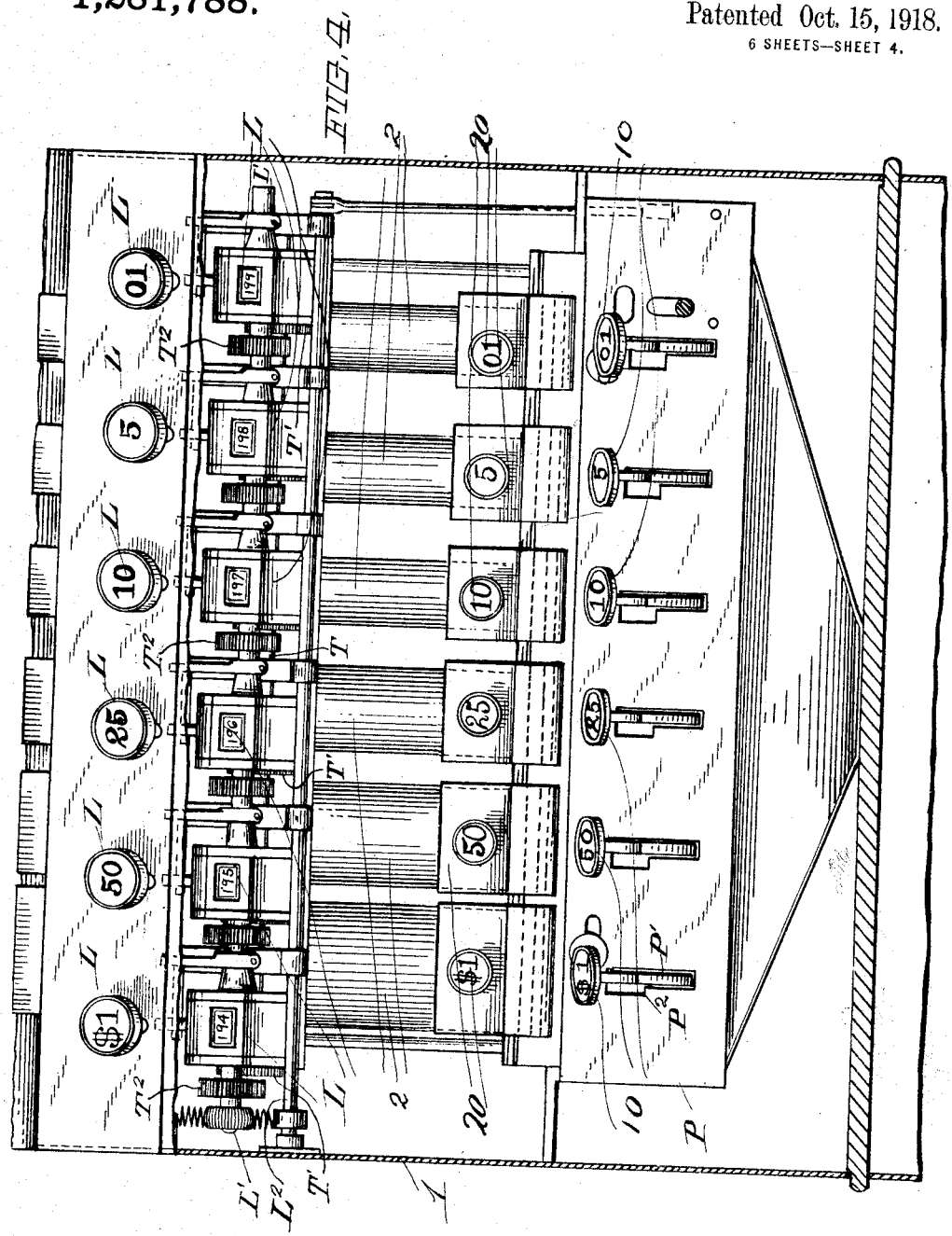

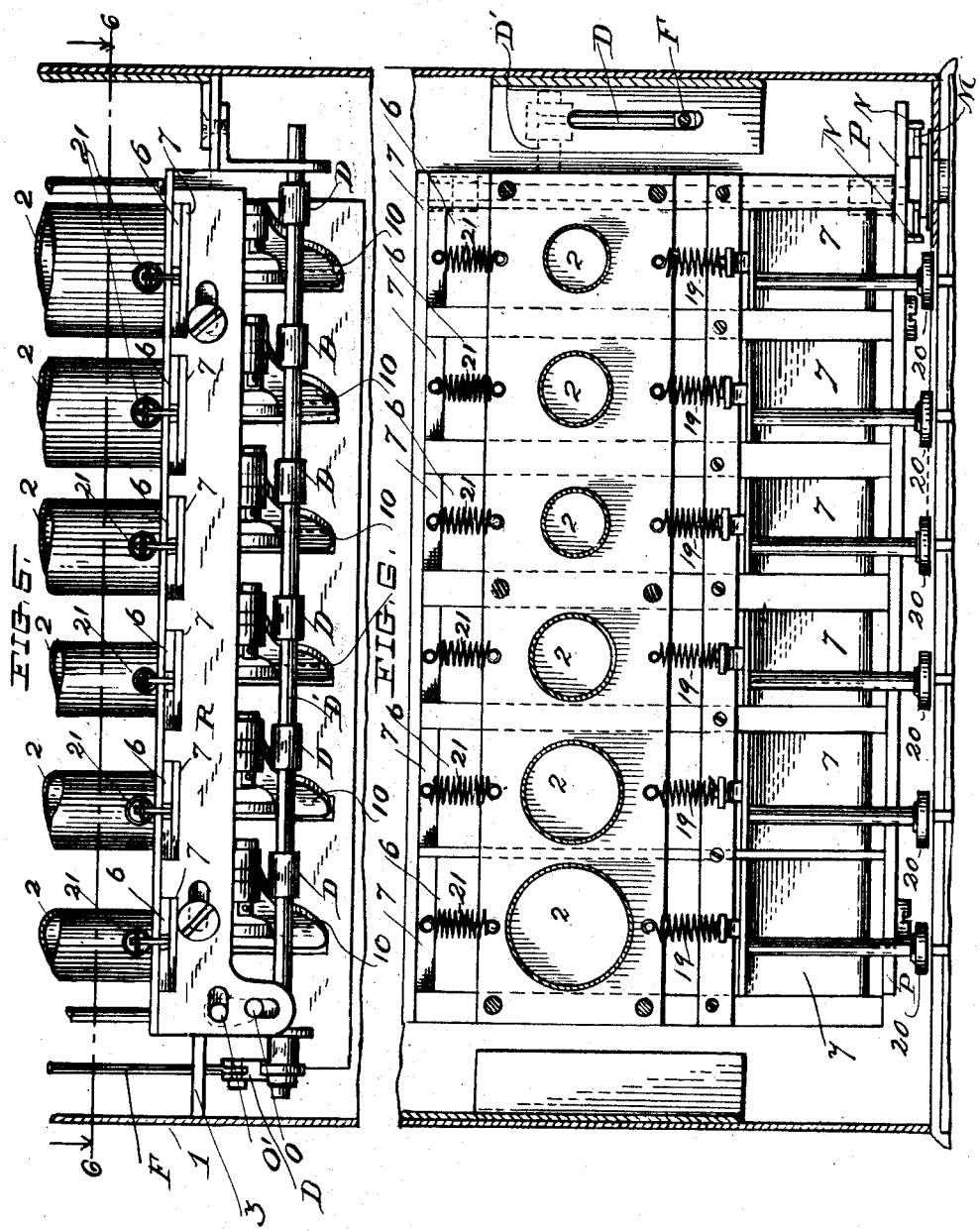

J. A. KIDWELL.
CREDIT SYSTEM CABINET.
APPLICATION FILED OCT. 23, 1915.

1,281,788.

Patented Oct. 15, 1918.
6 SHEETS—SHEET 6.

Witnesses:
J. C. Turner

Inventor
James Arthur Kidwell
By
Attorney

UNITED STATES PATENT OFFICE.

JAMES ARTHUR KIDWELL, OF CLEVELAND, OHIO.

CREDIT-SYSTEM CABINET.

1,281,788.  Specification of Letters Patent.  Patented Oct. 15, 1918.

Application filed October 23, 1915.  Serial No. 57,432.

*To all whom it may concern:*

Be it known that I, JAMES ARTHUR KIDWELL, a citizen of the United States, and resident of Cleveland, in the county of Cuyahoga and State of Ohio, have invented certain new and useful Improvements in Credit-System Cabinets, of which I hereby declare the following to be a full, clear, and exact description, such as will enable others skilled in the art to which it appertains to make and use the same.

The invention has reference to practical and efficient forms of improvements in credit system cabinets for the business of retail merchants, and the objects are primarily to provide means for enabling the operator to make change quickly and at the same time to keep a correct record of all credit transactions, in conjunction with a check credit system of which the machine is a part.

In this system metal disks or checks are employed in place of coins and the cabinet includes a convenient means for storage and distribution of the checks which when loaned to a credit customer represent a money value in units and fractions thereof.

The system comprises in itself a series of metal checks of the various denominations which are loaned to a customer in given amounts in proportion to his ascertained credit limit, for which a receipt or promissory note is taken from the customer as an evidence of debt, and these checks comprise tokens of value and are exchanged by the customer for merchandise in proportion to their face value, and a record of daily sales is automatically kept by means of a counting device in the machine, and the notes and receipts are filed in a suitable loose leaf ledger provided for the purpose and are preferably kept in a drawer of the cabinet.

By this means a great saving in time and labor of bookkeeping is effected for the merchant and better service is afforded the customer.

The invention further comprises the combination and arrangement of parts and construction of details hereinafter described, shown in the accompanying drawings and specifically pointed out in the claims.

Figure 1:
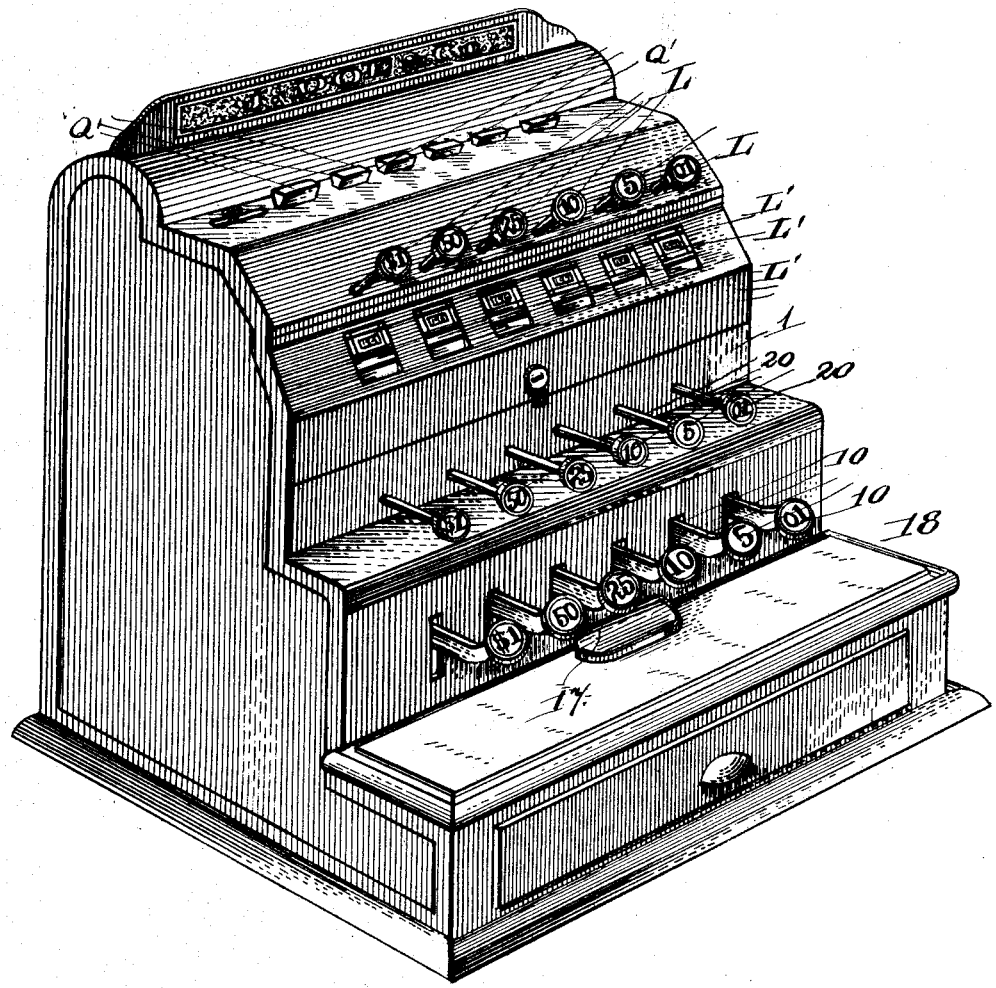
Figure 7:
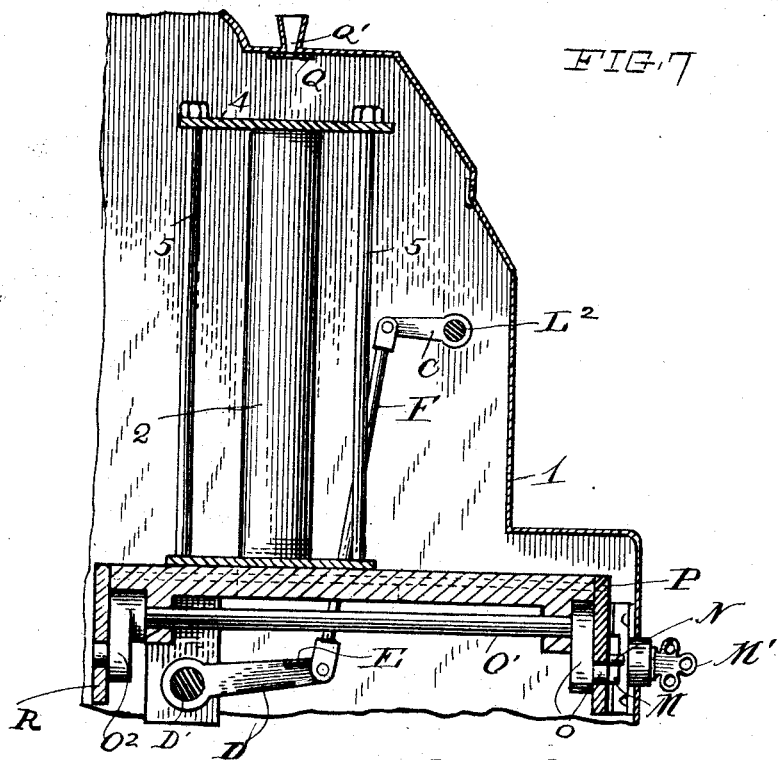
Figure 8:
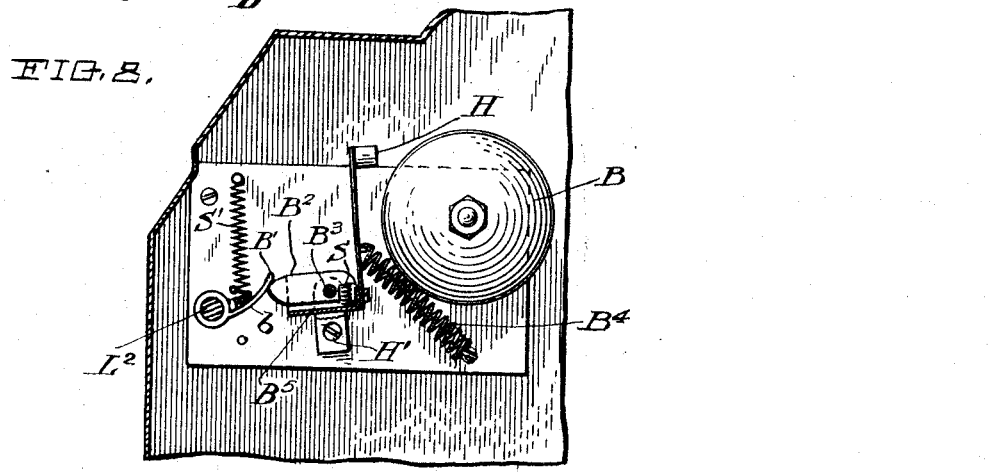

In the accompanying drawings Figure 1 is a perspective view of the cabinet; Fig. 2 is a plan view of the same; Fig. 2$^a$ is a view of the locking plate, and Fig. 2$^b$ of the lock; Fig. 3 is a vertical transverse section of the cabinet taken on the center line 3—3 Fig. 2 of one of the check holding tubes or magazines; Fig. 4 is a front view thereof with the front of the casing and drawer for storing checks, and accessories removed; Fig. 5 is a partial rear view of the cabinet showing the check releasing levers, and locking plate for the check removing slides; Fig. 6 is a horizontal section on line 6—6 Fig. 5; Fig. 7 is a vertical transverse section showing the inner face of one end of the casing of the cabinet, and showing the shaft and cranks which operate the locking plates, and the shaft which operates the bell; Fig. 8 is a similar view of the inner face of the other end showing the bell sounding mechanism. Fig. 9 is a sectional view showing one of a second series of counting devices. Fig. 10 is a similar view showing one of a third series of counting devices.

In these views 1 is a casing which incloses the operating parts of the cabinet; 2, 2, 2, 2, 2, 2, are tubular reservoirs which contain checks of selected value as for $1.00, 50¢, 25¢, 10¢, 5¢ and 1¢.

These are mounted upon a platform 3, horizontally placed in the casing and are supported at the upper end by means of the horizontal plate 4 and vertical rods 5, 5. The checks are entered through graded slots Q' in the top of the casing.

Underneath each check receptacle are shown two slides upper and lower 6 and 7 respectively. The upper one of these slides 6 is provided with a passage 8 which is normally open to permit the circular checks 9 stored in the receptacle to drop upon the lower slide 7 one at a time.

The first operation of the machine is to register the sale. This is accomplished by first pushing upon the selected counting lever or key L. See Figs. 3 and 9 which operates the shaft L' of a counting or indicating device Z in Figs. 3 and 4, by means of a lug $b$ and an arm $b'$, and rotates the same to show that a sale equaling the amount indicated on the key has been made.

When it is desired to release the checks one at a time the key 10, pivoted in the rear of the casing at 11, is depressed by the finger, and a two armed crank 12 is rotated upon its pivot 13, one arm 12' of this crank engages the opening 14 in the slide 6, and moves it forward until the check comes into alinement with the opening 15 in the slide 7 below. At this moment the single check will fall through the opening 15 and drop upon the chute 16 and slide through the opening 17 in the wall of the case and fall upon the platform 18, preferably a marble slab arranged to receive it. A spring 19 returns the slide and lever to their first position.

In this manner selected checks can be delivered one at a time from any one of the receptacles desired.

When it is desired to discharge all of the circular checks at one time from any selected receptacle, to enable the operator to count the checks remaining in the machine, a corresponding key 20 is pushed inward and moves the lower slide 7 until the openings in the receptacle, upper slide and lower slide, correspond, and are held in this position until all the checks in the corresponding receptacle fall into the chute at once. A spring 21 returns the slide and key to their original position.

The use of the upper slide is for the purpose of releasing one check from the tube to make change.

For instance, the sale amounts to 25 cents and a dollar check is offered in payment. The 25 cent registering key is first pressed, then the dollar check is deposited in the dollar tube of the cabinet and a 50 cent check and a 25 cent check are severally withdrawn from the corresponding tubes, and this is instantly accomplished by pressing the two keys operating the 50 and 25 cent slides at one simultaneously downward movement. This completes the entire transaction. The change in the checks withdrawn is returned to the customer, to spend at a later date.

This operation is much more quickly performed than can be accomplished by any writing or accounting credit system in use by retail merchants.

A bell B is operated at the time that registration is made by means of a separate finger B' upon the shaft $L^2$, which in turn depresses the tilting bar $B^2$ pivoted at $B^3$, upon a platform $B^5$ on the hammer and actuates the hammer H pivoted at H' to strike upon the bell.

A spring S returns the bar $B^2$ and a spring S' returns the finger B'. The tilting movement provided for the bar $B^2$ permits the return of the finger B' (see Fig. 8). A spring $B^4$ returns the hammer H.

The tilting movement provided for the bar $b^2$ permits the return of the finger $b^3$. See Fig. 8.

A spring arm $L^4$ operatively connects the arms $b$ and C so that the bell can be sounded by means of the key L.

The bell can also be sounded by means of the shaft $L^2$, cranks C and D, bar E and rods F, F, so that every key lever 10 will operate the bell whenever the subtracting key is operated, since the bar E is engaged by every key 10 when depressed.

Means are shown for preventing the movements of both upper and lower slides simultaneously at any time to prevent any one but the approved operator from tampering with the machine.

On the front of the cabinet is shown a plate P having vertical slots P', P', in which the subtracting levers move up and down. At the upper end of each slot at the left side is shown a horizontal extension $P^2$ of the slot.

This plate is moved longitudinally to engage the horizontal slots with the subtracting levers to lock them from movement. This is preferably accomplished by means of the sliding bolt M which is actuated by a key M' and engages a pin or projection N at each end thereof upon the plate P to move it alternately in opposite directions.

As the front plate P moves it operates a crank O upon a shaft O', which passes transversely through the machine, and in the rear a corresponding crank $O^2$ operates a sliding plate R which alternately moves across the ends of the lower slides and releases the same, thus affording means for preventing movement of the dumping or lower slide.

In Fig. 9 a second series of counters L', $L^7$ is shown which is one of a series operatively connected with the lever key 10 and bar E by means of the arm 20 and rod F and arm C'. By means of this second series a record of the amount of checks given out as change can be kept, whereas the counting series operated by the keys L keep the record of the amount of daily sales only.

A third series of counters $L^6$ is shown in Fig. 10 to permit the registering of each check as entered.

This completes the counting system and announces to the operator,

1st. The complete record of the total amount of checks placed in the register. This is automatically caused by the insertion of the coins.

2nd. The amount of checks subtracted or paid out and is automatically registered when the subtracting key 10 withdraws a check from the receptacle, 3rd. The amount of daily sales. This is indicated by a separate key L.

At T is shown a shaft parallel with the shaft $L^3$ and provided with spur gears T', T' which by pushing in the shaft can be made to engage with corresponding gears $T^2$, $T^2$ on the shaft $L^2$ to operate all the counters Z to return them simultaneously to zero. By pulling out this shaft the gears can be disconnected.

A slide Q underneath slots Q' in the upper side of the cabinet can be used to delay the entrance of the checks into the receptacles, so that the operator can look again and see if the right check is placed in the right receptacle.

Having described the invention what I claim as new and desire to secure by Letters Patent is:

1. In a credit system cabinet, in combination, a casing a series of vertical check receiving receptacles therein, upper and lower slides underneath each receptacle, the upper slide having a check receiving opening normally registering with said check receptacle and the lower slide having a similar opening normally spaced from the opening in the upper slide, a platform upon which said slides rest, said platform having an opening beneath each receptacle and beneath the opening in the lower slide, means for separately operating each slide, and means for simultaneously locking said slides from movement.

2. In a credit system cabinet, a series of vertical receptacles for selected credit checks, an upper slide beneath each receptacle provided with a check receiving opening normally registering with its respective receptacle, a lower slide beneath said upper slide, and provided with a check discharging opening normally spaced from the opening in the lower slide, a casing inclosing said receptacles, a support in said casing for said slides, said support having a discharge opening, a horizontally moving key for operating one of the slides, and a vertically movable key and connecting mechanism for operating the other slide, a sliding plate adapted to intercept the movements of the slide operated by the horizontally moving key and lock the same, and a sliding plate adapted to lock the vertically movable key from movement.

3. In a credit system cabinet, a series of vertical receptacles for selected credit checks, an upper slide beneath each receptacle provided with a check receiving opening normally registering with its respective receptacle, a lower slide beneath said upper slide, and provided with a check discharging opening normally spaced from the opening in the lower slide, a casing inclosing said receptacles, a support in said casing for said slides, said support having a discharge opening, a horizontally moving key for operating one of the slides, and a vertically movable key and connecting mechanism for operating the other slide, a sliding plate adapted to intercept the movements of the slide operated by the horizontally moving key and lock the same, and a sliding plate adapted to lock the vertically movable key from movement, and means for simultaneously operating said plates to lock both of said slides.

4. In a cabinet, a series of vertical check receptacles open at the bottom, an upper slide beneath each receptacle, said upper slide provided with an opening normally coinciding with the opening in its respective receptacle, a second slide beneath the upper slide and having an opening spaced from the opening in said upper slide, an apertured support for the slides, a casing in which said receptacles and support are mounted, a longitudinally slidable locking plate for the upper slide, a longitudinally movable locking plate for the lower slide, and a shaft mounted in said casing, operatively connected with both of said slidable plates, and a bolt slidable in said casing and adapted to operate one of said locking plates and thereby said shaft and the other plate.

In testimony whereof, I hereunto set my hand this 8" day of October, 1915.

JAMES ARTHUR KIDWELL.

In presence of—
WM. M. MONROE,
RALPH W. JEREMIAH.

Copies of this patent may be obtained for five cents each, by addressing the "Commissioner of Patents, Washington, D. C."